METHOD OF MAKING ELECTROMECHANICALLY SENSITIVE MATERIAL

Filed March 13, 1948

*INVENTOR.*
SHEPARD ROBERTS
BY Kenway, Jenney, Witter & Hildreth
ATTORNEYS

United States Patent Office 2,702,427

Patented Feb. 22, 1955

2,702,427

METHOD OF MAKING ELECTROMECHANICALLY SENSITIVE MATERIAL

Shepard Roberts, Scotia, N. Y.

Application March 13, 1948, Serial No. 14,673

3 Claims. (Cl. 29—25.35)

Figure 1:
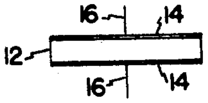

This invention relates to electromechanically sensitive materials, and more particularly to such materials in a form suitable for the utilization of certain modified electrostrictive characteristics thereof in transducing between energy of the types designated as electrical and mechanical. The term "electromechanically sensitive," as used in this specification and in the appended claims, is descriptive of materials capable of developing substantial mechanical strains when subjected to electrostatic fields.

It is well known that certain crystalline materials, such as quartz and Rochelle salt, are piezoelectric. For practical applications of the piezoelectric phenomena exhibited by these materials, it has been necessary to provide single crystals of the material of a size to permit cutting bars or plates therefrom to meet the requirements of the desired applications. When the faces of the bar or plate have the proper orientation with respect to the crystallographic axes of the material, and when provided with suitable electrodes, the crystal element develops an appreciable potential when deformed. Conversely, an applied potential brings about a corresponding deformation of the element. Such crystal elements have numerous applications as electromechanical transducers.

Recent investigations have revealed that certain polycrystalline ferroelectric materials such as ceramics containing compounds of titanium exhibit unusual dielectric and electrostrictive phenomena. The term "polycrystalline ferroelectric materials" as used herein, refers to those polycrystalline materials which exhibit electrical properties similar to the magnetic properties of ferromagnetic materials. These ferroelectric materials are characterized, for example, by exhibiting a dielectric hysteresis effect. Dielectric constants, measured at radio frequencies, of over 100 and even as high as several thousand have been reported, and anomalous effects consistent with the presence of unusual electrostrictive or piezoelectric properties have been observed. In particular, electromechanical effects useful in transducers have been obtained while bodies of such polycrystalline materials are subjected to electrostatic polarizing fields of rather high intensity. Ordinary dielectric electrostrictive effects have very small magnitudes and obey a nonlinear relationship, essentially a square-law relationship, which results in the production of small mechanical strains having a minimum frequency double the fundamental frequency of an alternating electrical field to which the material is subjected. The useful electromechanical effects obtainable with the use of a polarizing field may be distinguished from the recognized electrostrictive phenomena, exhibited to a small extent by many dielectric materials, by the developing of electrical charges when subjected to mechanical stresses in addition to the developing of mechanical strains when subjected to electrostatic fields, by the large magnitudes of the electromechanical effects, and by the substantially linear nature of these effects over moderate ranges of mechanical stresses and A.-C. voltage gradients. Since it is not necessary to produce large single crystals of such a titanate ceramic material, polarized as described, in order to utilize the electromechanical properties referred to hereinabove, and since the physical and chemical attributes of these materials are advantageous for many applications, these materials show considerable promise for use in electromechanical transducers.

However, bodies formed of these ferroelectric materials by the usual methods familiar to the ceramic art exhibit no inherently useful electromechanical properties after being fired, since the orientation of the crystallographic axes of each individual crystallite or crystalline domain is essentially a random one. On the other hand, the maintenance of a biasing field by continuously providing a D.-C. voltage gradient within the material may constitute, in some cases, a rather burdensome design requirement.

It is an object of the invention to provide a new method of making an electromechanically sensitive material.

It is another object of the invention to provide a new method of making electromechanically sensitive dielectric material of the polycrystalline ceramic type suitable for providing a substantially linear electromechanical transducing action without the simultaneous application of a biasing field to the material.

It is a further object of the invention to provide a new method of making an electromechanically sensitive element suitable for use in electromechanical transducers.

In accordance with the invention, an electromechanically sensitive material comprises a body of polycrystalline dielectric material having remanent electrostatic polarization so that the body is capable not only of developing mechanical strains when subjected to electrostatic fields but also of developing electrical charges when subjected to mechanical stresses. In accordance with one aspect of the invention, the method of making an electromechanically sensitive element comprises forming a body of polycrystalline dielectric material and thereafter subjecting that body to a polarizing electrostatic field for a predetermined period of time to effect remanent electrostatic polarization of the material.

For a better understanding of the present invention, together with other and further objects thereof, reference is had to the following description taken in connection with the accompanying drawings, and its scope will be pointed out in the appended claims.

Figure 2:
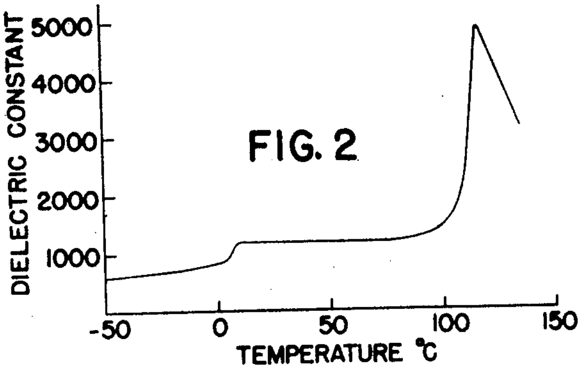
Figure 3:
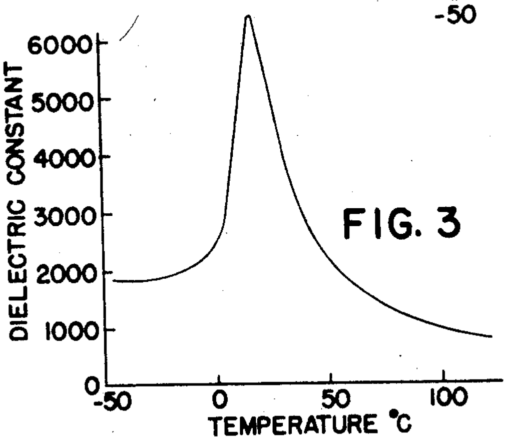
Figure 6:
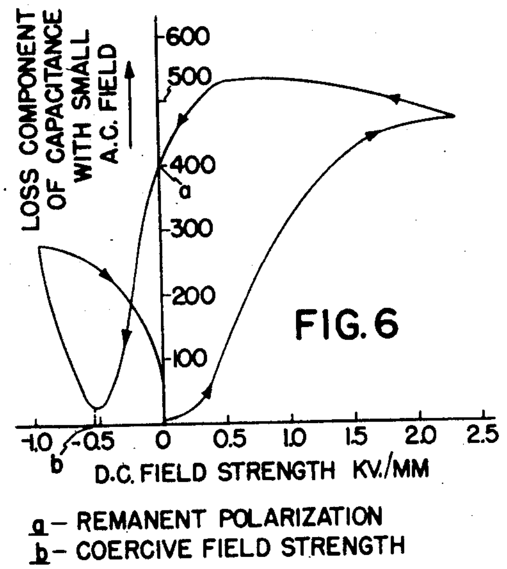
Figures 4, 5:
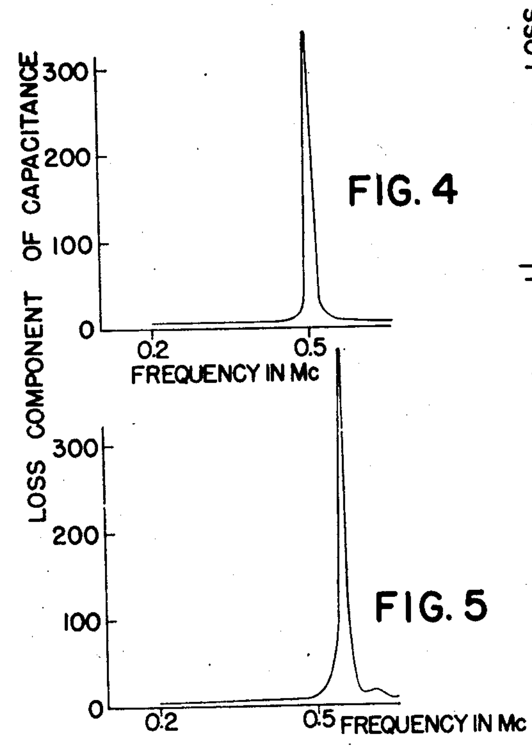

In the drawings, Fig. 1 is a view of a typical electromechanical transducer unit utilizing an electromechanically sensitive element embodying the present invention; Fig. 2 is a plot showing the variation in dielectric constant with temperature for a typical polycrystalline body of barium titanate, the measurements being taken with zero biasing field and at a frequency in the vicinity of 400 kilocycles; Fig. 3 is a similar plot of dielectric constant versus temperature for a polycrystalline element composed of a mixture of barium titanate and strontium titanate, similarly measured; Figs. 4 and 5 are plots representing the shift in resonant frequency of a polarized polycrystalline element as the physical dimensions thereof are altered; and Fig. 6 is a plot indicating the electromechanical response of a body of barium titanate material to which a small A.-C. field is applied, as a function of the electrostatic history of the body, that is, a function of the polarizing D.-C. field strength to which the body has been subjected.

As has already been indicated, ceramic materials containing barium titanate or strontium titanate or mixtures of these titanates possess unusual dielectric properties. Their dielectric constant varies sharply with temperature in certain ranges, becoming very high at one or more critical temperatures, known as Curie points. Below the primary Curie point dielectric hysteresis is found, while above such temperature dielectric losses become low and the dielectric constant tends to vary inversely as the temperature of the material minus a constant temperature. X-ray diffraction data indicate that a change occurs in the crystallographic lattice structure, the structure being pseudo-cubic below the Curie point and cubic above that temperature.

The plot of dielectric constant against temperature, as shown in Fig. 2 for a typical element of barium titanate, indicates a peak close to 5,000 at a temperature of approximately 120° C., this being the primary Curie point for this material. As strontium titanate is added progressively in admixture with the barium titanate, the peak in dielectric constant at the Curie point shifts toward progressively lower temperatures. Fig. 3 shows a Curie point in the vicinity of 20° C. for the approximate composition 75% $BaTiO_3$—25% $SrTiO_3$ by weight.

At temperatures below the Curie point for the material in question, these materials exhibit a marked change in their electrical properties upon the application of an electric field. These changes are believed to result from a modification of the crystal structure under the influence of the applied potential, such modification probably involving a reorientation of the crystal domains or, perhaps more strictly, a rearrangement of atoms and molecules within the crystal domains.

One manifestation of the effect of an applied potential at a temperature below the primary Curie point is represented in Fig. 4. To obtain the data for this curve, an A.-C. potential of controllable frequency was applied between the electrodes on the flat faces of a thin disc of barium titanate with the simultaneous application of a D.-C. biasing potential across the electrodes. The magnitude of this biasing field in a particular test was approximately 300 volts, producing a field strength of substantially 2800 volts per millimeter of thickness of the disc-shaped element. By suitable bridge means the reactive component and the loss component of the admittance or of the capacitance of the element itself may be determined over a considerable range of frequencies of the A.-C. potential. The plot of Fig. 4 represents the resistive or loss component, expressed in micromicrofarads as a component of the capacitance of the element. It will be observed that a sharp peak occurs in the plot of this component at a frequency of approximately 0.5 megacycle per second. This indicates that a resonant condition exists at that frequency.

This condition of resonance, it has been established, is the result of a mechanical resonance in the element and is a function of the physical dimensions thereof, particularly the diameter. This is confirmed by the curve of Fig. 5. For this plot, the test element on which the curve of Fig. 4 is based was altered by removing material from the periphery to decrease the effective diameter of the disc. Fig. 5 indicates a shift to a somewhat higher resonant frequency. Comparison of the change in frequency and the decrease in diameter indicates that the resonant frequency is at least roughly inversely proportional to the diameter. This is consistent with the theoretical expression for the natural frequency of mechanical vibration of a circular plate in which the vibratory motion is parallel to the faces. Computations based on the approximate elastic properties of the material indicate that the vibrations occur at the fundamental frequency of the A.-C. potential applied to the element. Excitation of the mechanical oscillation by electromechanical coupling is accompanied by a high resistive or loss component of the apparent capacitance of the element. Accordingly, it follows that under these conditions the element behaves in a manner quite analogous to the behavior of a piezoelectric material, and is suitable for use in electromechanical transducers in place of the familiar piezoelectric elements cut from single crystals.

This resonant condition occurs in significant strengths only at temperatures below the primary Curie point of the material, as represented in Figs. 2 and 3 for two different compositions of titanate substances. As the temperature of a particular composition of titanate substances is raised toward its primary Curie point, the amplitude of the resonant effect represented in Figs. 4 and 5 slowly decreases, until at temperatures substantially in excess of the primary Curie point the loss component of capacitance shows almost no rise at the frequencies of mechanical resonance, indicating not only low dielectric hysteresis losses but also practically no linear electromechanical coupling of the type desirable for use in transducers. For this reason electromechanically sensitive material of the type described should have its Curie point above the highest temperature to be encountered during its use in a transducer.

It has already been indicated that the effects resulting from the application of an electric field are believed due to a reorientation of the crystal domains. Prior to the application of a potential sufficient to rearrange or reorient the structure, the material as a unit possesses no electrostrictive or piezoelectric properties useful in the ordinary electromechanical transducer. It now has been discovered that reorientation or polarization not only may be established by the application of a suitable polarizing field to the material, but also under certain conditions may remain after the polarizing potential has been removed. This discovery substantially enhances the usefulness of these materials in transducers, since it avoids the necessity of providing a relatively high biasing potential in the various circuit applications of the transducers.

Fig. 6 illustrates this effect of remanent polarization. Fig. 6 is a plot of the loss component of the apparent capacitance of an electrode barium titanate plate to which is applied at a temperature below the primary Curie point of the plate a small A.-C. field at a frequency of 10 megacycles per second, which is approximately the frequency of one of the most prominent mechanical resonances of the particular plate under test, probably a thickness-mode resonance. In Fig. 6 the loss component is expressed as the ratio of the loss component of capacitance to the capacitance of the same electrode structure assuming an air or vacuum dielectric; that is, it is expressed as the loss component of the apparent dielectric constant. This loss component is plotted against the D.-C. biasing field strength. Following the curve in the direction of the arrows, illustrating the electrostatic history of the material, the biasing field strength is increased almost to 2500 volts per millimeter. It is well known in the piezoelectric art that a piezoelectric crystal plate shows a high loss component of its apparent capacitance if excited with an alternating current of a frequency close to that of a mechanical resonance. As is the case at the resonant frequencies shown by Figs. 4 and 5, this loss is due to the mechanical dissipation of the electrical energy transduced into mechanical energy by the crystal. Referring to Fig. 6, the increasing biasing field is accompanied by increasing electromechanical action, evidenced by an increasing loss component of the apparent capacitance. This loss component is a measure of the transducing action, as in the case of piezoelectric crystals, and at the higher values reached in Fig. 6 indicates electromechanical characteristics comparable with the best piezoelectric materials. As the D.-C. field strength is lowered until the polarizing field is removed completely, the loss component first increases somewhat, then falls to a value indicated at *a*, which is a measure of the remanent polarization and is a large fraction of the polarization available with maximum biasing field. Application of increasing biasing fields of opposite polarity causes the polarization, as represented by the loss component, to decrease almost to zero at the field strength indicated at *b*, which may be termed the coercive field strength, then to increase in the other direction of polarization. Subsequent change in the field strength in the direction of positive voltage gradients again causes the loss component to approach a minimum.

In general, it has been found that the application of a potential greater than about 2000 volts per millimeter to the titanate material, and preferably in the range of 2000 to 4000 volts per millimeter, leaves the element strongly polarized upon removal of the field. Because the breakdown potential for the material may not be appreciably above about 4000 volts per millimeter, this field strength usually represents a practical upper limit for the polarizing field. A body of a suitable polycrystalline dielectric material subjected for a predetermined period of time to such a polarizing field has high remanent electrostatic polarization, so that the body is capable not only of developing mechanical strains when subjected to electrostatic fields, as is the case to some extent with all electrostrictive materials, but also of developing electrical charges when subjected to mechanical stresses without the simultaneous application of a biasing voltage to the body. When the body has been polarized properly in this manner, the strains are substantially linearly related to the applied A.-C. fields and conversely the electrical charges are substantially linearly related to the applied mechanical stresses over moderate ranges of such applied fields or stresses.

Although the biasing fields are applied only temporarily, the application thereof to the element should continue for a predetermined period of time, at least for a short interval. It is preferred that the polarizing field be applied for at least several minutes. Nevertheless polarization with lower field strength or over shorter periods of time may be effective. Properly polarized materials retain an appreciable part of their remanent polarization indefinitely, and pronounced or largely undiminished electromechanical effects have been observed many months after the temporary polarizing field was applied. This permits the element to be employed effectively without the continued utilization of a polarizing potential in applications requiring an efficient electromechanical transducer. It is important that the element not be subjected after such polarization to a temperature higher than its Curie point, which would destroy the remanent polarization and necessitate repolarization. Furthermore, the device should not be subjected to electric fields in a direction opposite to that of the initial polarizing field of a magnitude sufficient to erase or seriously decrease the remanent polarization unless it is desired to depolarize the element or to repolarize in a new direction.

Fabrication of the polycrystalline elements may be in accordance with conventional ceramic practice. Although polycrystalline materials of various compositions may be employed, a suitable starting material is a technical grade of barium titanate, $BaTiO_3$, as produced by the Titanium Alloy Manufacturing Company of Niagara Falls, N. Y., for ceramic purposes; this titanate material contains roughly several tenths of one percent by weight of each of the oxides silica, lime, alumina and magnesia. Thin elements may be formed by suspending a powder in a slip and extruding onto a plate, after which the extruded sheet may be stripped, cut into discs, and fired in a conventional furnace or kiln. If desired, the discs can be fired onto platinum foil to provide an electrode, and a silver electrode thereafter fired on the other face. Thicker elements may be made by pressing the titanate material in powder form into plates or discs and thereafter firing. Suitable firing temperatures are of the order of 1300 to 1500° C.

A typical unit produced in such a manner is illustrated in Fig. 1. A ceramic plate 12, which may have the shape of a disc of relative thickness and diameter represented in the edge view of Fig. 1, is provided with metallic electrodes 14, 14 on the upper and lower faces thereof. These may be fired-on silver electrodes and may have leads 16, 16 soldered thereto.

To confirm the electromechanical effects obtainable with polarized barium titanate, a sample prepared as above and about ½ inch in diameter and ⅛ inch in thickness was polarized by the momentary application of a D.-C. potential of 6000 volts. Thereafter suitable mechanical stresses were applied, and the resulting voltages were measured by means of a vacuum tube electrometer. A voltage of the order of several volts was found for a force of several kilograms. Both the longitudinal effect, axially of the disc and parallel to the mechanical stress and to the direction of polarization, and the transverse effect, perpendicular to the direction of applied stress, were observed.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of activating a polycrystalline ferroelectric material to exhibit strong remanent electrostatic polarization comprising subjecting said material to a polarizing electrostatic field in excess of 2000 volts per millimeter of said material for a short interval at a temperature below the primary Curie point of said material.

2. The method of activating a polycrystalline material comprising principally barium titanate to exhibit strong piezoelectric properties comprising subjecting said material to a polarizing electrostatic field in excess of 2000 volts per millimeter of said material for at least several minutes at a temperature below the primary Curie point of said material.

3. The method of making an electromechanically sensitive element suitable for use in electromechanical transducers comprising, forming a body of polycrystalline material comprising barium titanate, covering a pair of opposing surfaces of said body with electrodes, and thereafter temporarily supplying a voltage between said electrodes sufficient to produce a polarizing electrostatic field in said body in excess of approximately 2000 volts per millimeter thereof while said body is maintained at a temperature below its primary Curie point.

References Cited in the file of this patent

UNITED STATES PATENTS

| | | |
|---|---|---|
| 2,402,515 | Wainer | June 18, 1946 |
| 2,402,516 | Wainer | June 18, 1946 |
| 2,444,998 | Matthias | July 13, 1948 |
| 2,467,169 | Wainer | Apr. 12, 1949 |
| 2,486,560 | Gray | Nov. 1, 1949 |
| 2,487,962 | Arndt | Nov. 15, 1949 |
| 2,538,554 | Cherry | Jan. 16, 1951 |

FOREIGN PATENTS

| | | |
|---|---|---|
| 583,639 | Great Britain | Dec. 23, 1946 |

OTHER REFERENCES

Partington: Nature, vol. 160, pages 877–878, December 20, 1947.

Roberts: Physical Review, vol. 71, No. 12, June 15, 1947, pages 890–895.

Donley: RCA Review, vol. 9, No. 2, June 1948, pages 218–227.